Dec. 14, 1965   L. J. BISHOP   3,223,226
DUMPING CONVEYOR SYSTEM
Filed Jan. 31, 1963   6 Sheets-Sheet 1
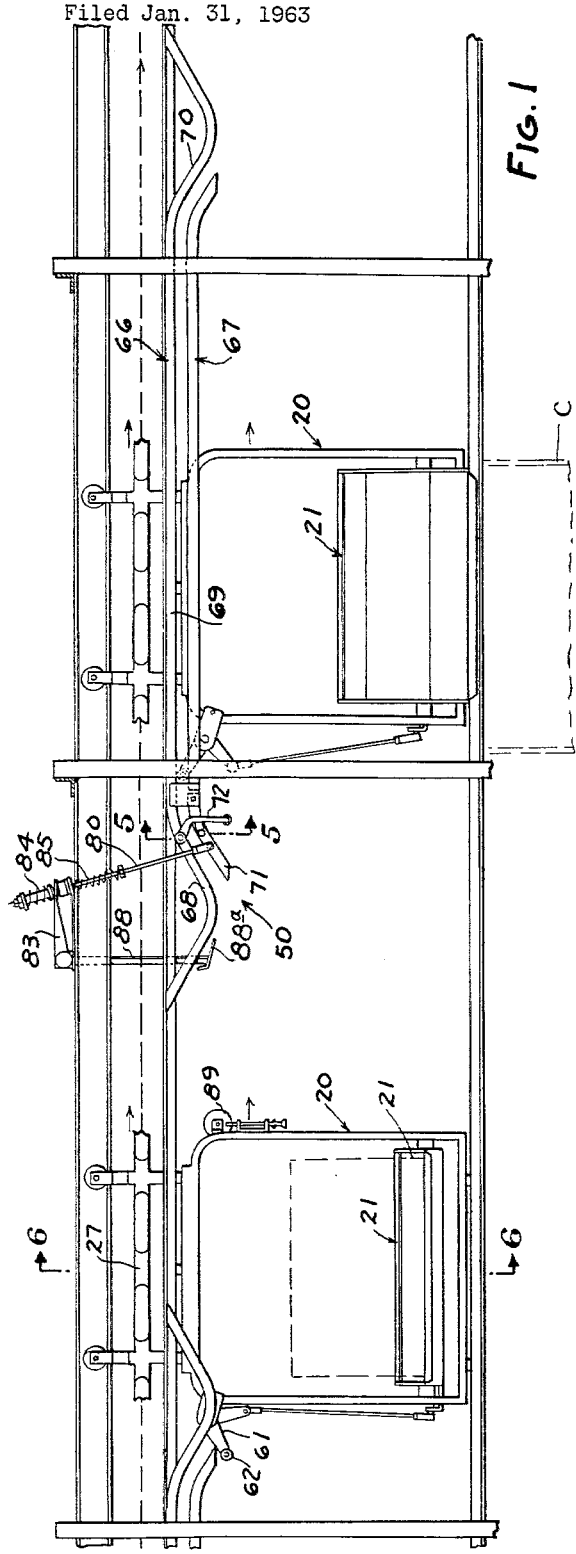
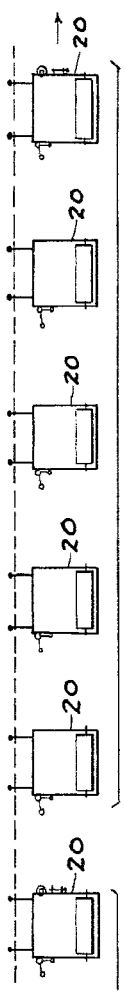
INVENTOR.
LEONARD J. BISHOP
BY
Barnes, Kisselle, Raisch & Choate
ATTORNEYS Dec. 14, 1965 L. J. BISHOP 3,223,226
DUMPING CONVEYOR SYSTEM
Filed Jan. 31, 1963 6 Sheets-Sheet 2
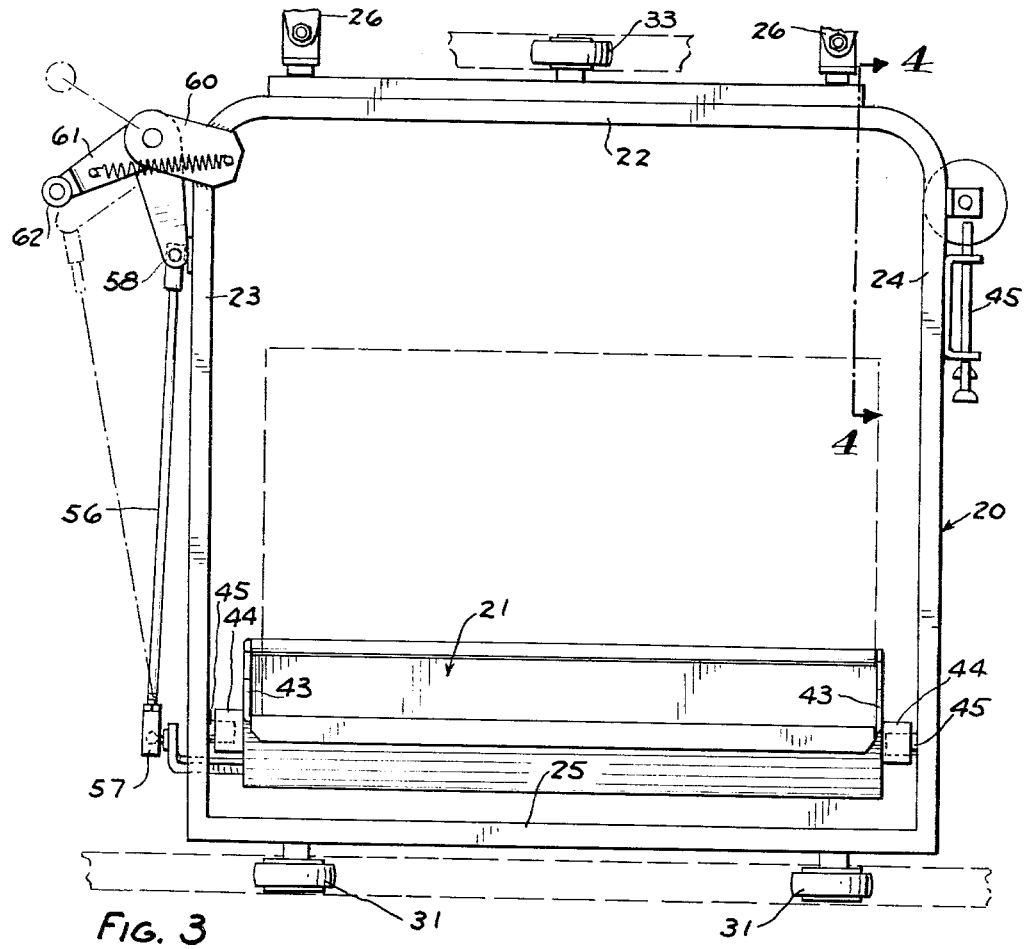
FIG. 3
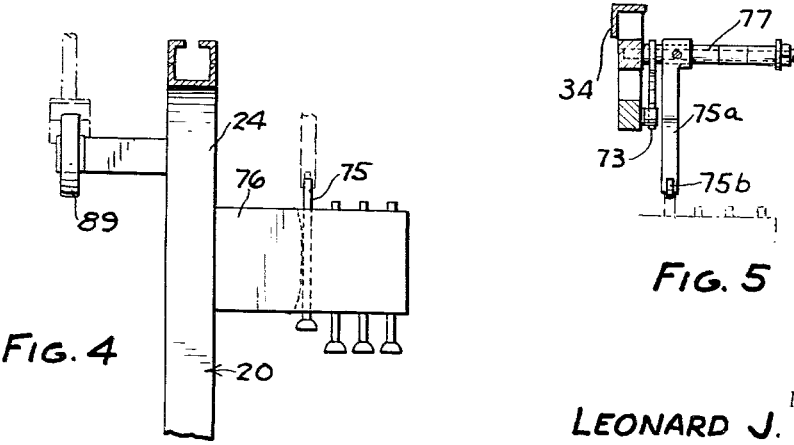
FIG. 4
FIG. 5
INVENTOR.
LEONARD J. BISHOP
BY
Barnes, Kisselle, Raisch & Choate
ATTORNEYS Dec. 14, 1965  L. J. BISHOP  3,223,226
DUMPING CONVEYOR SYSTEM
Filed Jan. 31, 1963  6 Sheets-Sheet 3
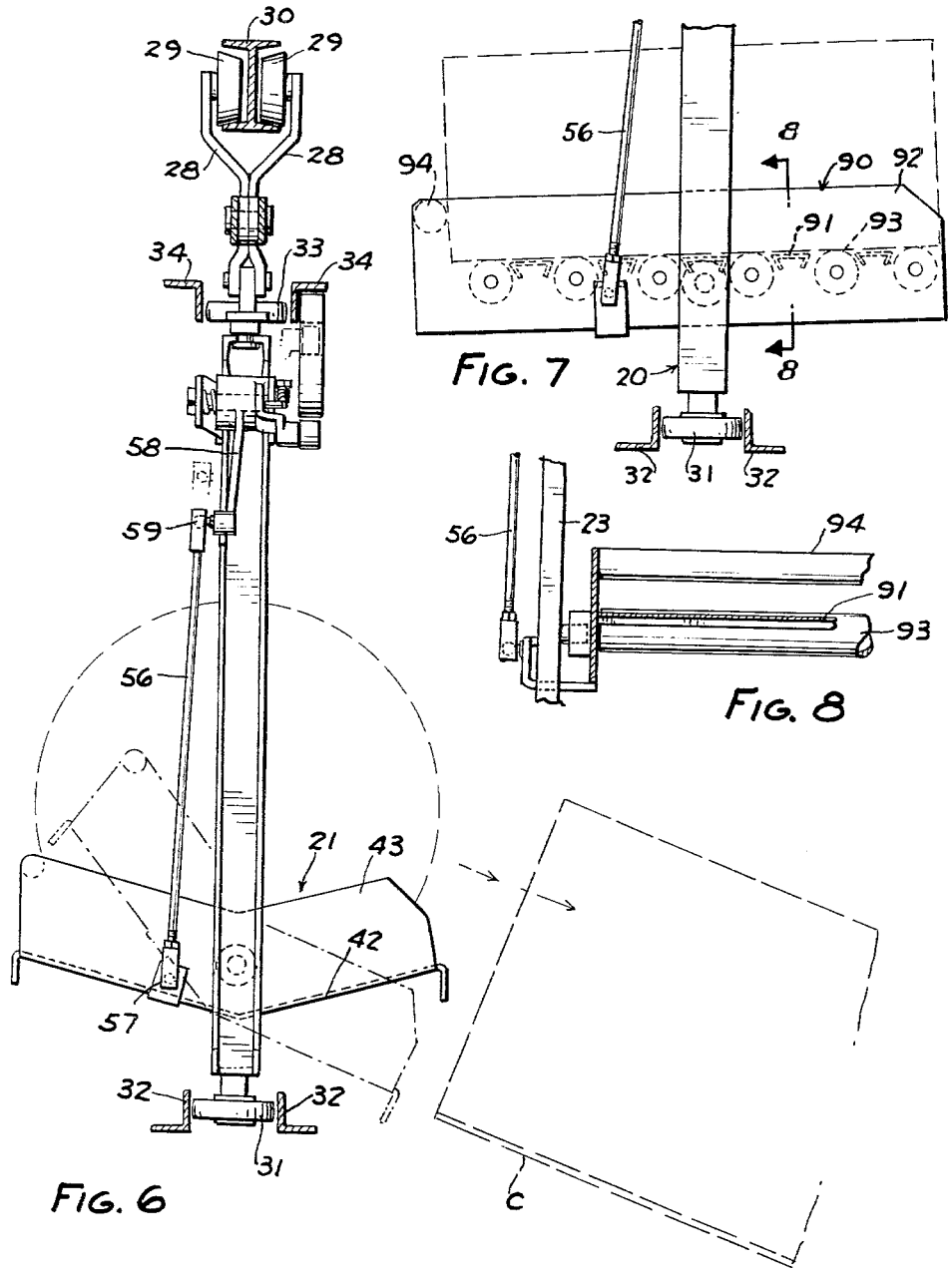
INVENTOR.
LEONARD J. BISHOP
BY
Barnes, Kisselle, Raisch & Choate
ATTORNEYS Dec. 14, 1965   L. J. BISHOP   3,223,226
DUMPING CONVEYOR SYSTEM
Filed Jan. 31, 1963   6 Sheets-Sheet 4
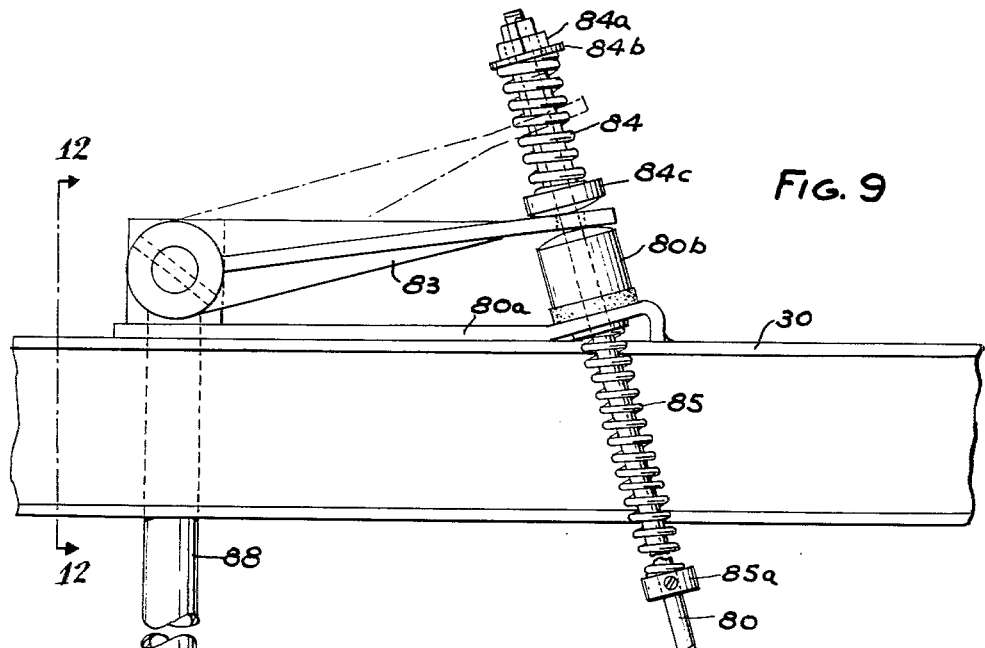
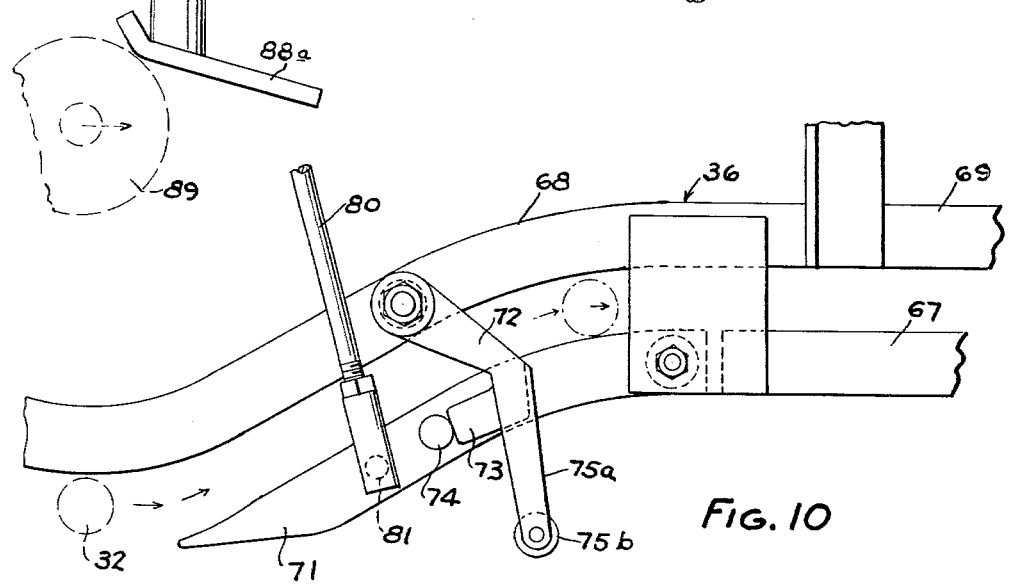
INVENTOR.
LEONARD J. BISHOP
BY
*Barnes, Kisselle, Raisch & Choate*
ATTORNEYS Dec. 14, 1965     L. J. BISHOP     3,223,226
DUMPING CONVEYOR SYSTEM Filed Jan. 31, 1963     6 Sheets-Sheet 5

INVENTOR.
LEONARD J. BISHOP
BY
Barnes, Kisselle, Raisch & Choate
ATTORNEYS

INVENTOR.
LEONARD J. BISHOP
BY
ATTORNEYS

United States Patent Office 3,223,226
Patented Dec. 14, 1965

3,223,226
DUMPING CONVEYOR SYSTEM
Leonard J. Bishop, Birmingham, Mich., assignor to Mechanical Handling Systems Inc., Detroit, Mich., a corporation of Michigan
Filed Jan. 31, 1963, Ser. No. 255,268
10 Claims. (Cl. 198—38)

This invention relates to dumping conveyor systems and particularly dumping conveyors of the type wherein a plurality of carriers supporting loads are suspended and moved along a predetermined path.

It is an object of this invention to provide an improved dumping conveyor system which includes simple reliable means for selectively dumping a load from a carrier moving along the conveyor.

It is a further object of the invention to provide such a system wherein groups of carriers can be controlled for dumping at a single station.

It is a further object of the invention to provide such a system which has simple reset means for resetting the system.

It is a further object of the invention to provide a conveyor system comprising carriers having a movable load support, the angular position of which is positively controlled at all times relative to the carrier.

In the drawings:

FIG. 1 is a fragmentary side elevation of a dumping conveyor system embodying the invention.

FIG. 2 is a diagrammatic side elevation of a system embodying the invention.

FIG. 3 is a fragmentary side elevation on an enlarged scale showing a carrier used in the conveyor system shown in FIG. 1.

FIG. 4 is a fragmentary sectional view taken along the line 4—4 in FIG. 3.

FIG. 5 is a fragmentary sectional view on an enlarged scale taken along the line 5—5 in FIG. 1.

FIG. 6 is a fragmentary sectional view on an enlarged scale taken along the line 6—6 in FIG. 1.

FIG. 7 is a fragmentary end elevational view of a modified form of carrier.

FIG. 8 is a fragmentary sectional view taken along the line 8—8 in FIG. 7.

FIG. 9 is a fragmentary view on an enlarged scale of a portion of the apparatus shown in FIG. 1.

FIG. 10 is a fragmentary side elevational view on an enlarged scale of a portion of the apparatus shown in FIG. 1.

Figure 11:
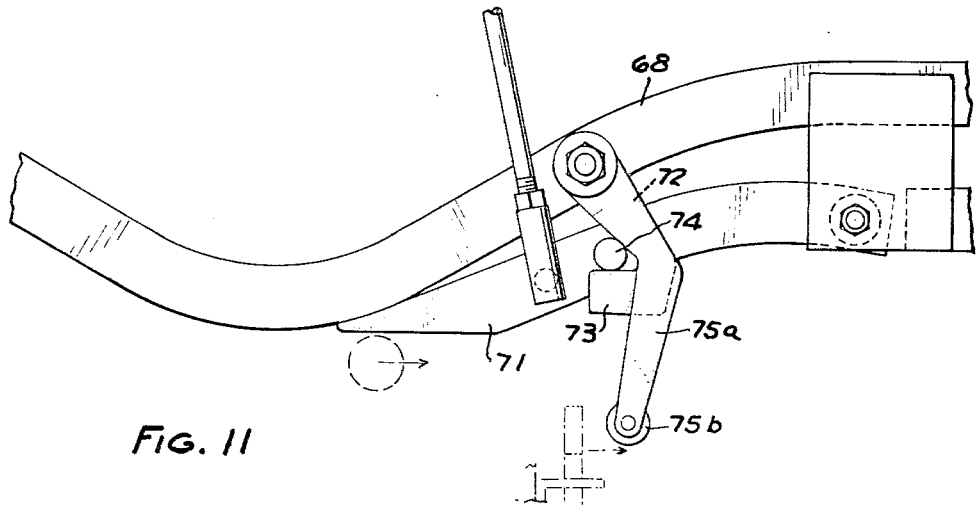
FIG. 11 is a view similar to FIG. 10 showing the parts in a different operative position.

Referring to FIG. 1, which is a fragmentary view of a portion of a dumping conveyor system embodying the invention, a plurality of carriers 20 having load bearing trays 21 mounted thereon, as presently described, are suspended and moved along a predetermined path. At selected points, it is desirable to pivot the trays 21 selectively and dump the load thereon into a suitable receptacle such as a chute C. In the system described, the carriers 20 are provided in groups as shown in FIG. 2, each group being controlled by the leading carrier thereof so that each group of carriers will be dumped at a predetermined station. In such a system, it is desirable to be able to control the dumping so that one group of carriers can be dumped at one station and another group of carriers can be dumped at another station.

As shown in FIGS. 1 and 3, each carrier 20 comprises a generally rectangular frame including a horizontal top bar 22, vertical side bars 23, 24 and a horizontal bottom bar 25. The carrier 20 is suspended from a pair of trolleys 26 which form a part of a conveyor chain 27. The upper ends of the trolleys 26 are provided with spaced arms 28 which support rollers 29 that ride on the flanges of an I-beam which defines a track (FIG. 6). The lower end of each carrier 20 is guided in its movement by rollers 31 rotatably mounted about vertical axes on the bottom bar 25 which rollers extend between angles 32 that define a lower guide track. The upper end of each carrier 20 is guided similarly by rollers 33 rotatably mounted about vertical axes on top bar 22 which rollers extend between angles 34 that define an upper guide track.

As shown in FIGS. 1, 3 and 6, each tray 21 has a bottom wall 42 which converges toward the center thereof and end walls 43. Each tray is formed with trunnions 44 on the end walls 43 which engage pins 45 through suitable bearings so that the tray is pivotally supported between bars 23, 24 for swinging movement about a horizontal axis extending generally longitudinally in the plane of the carrier 20.

Each carrier 20 is adapted to be normally positioned with the portions of the bottom wall converging downwardly, as shown in FIG. 6, and adapted to be swung from a position shown in FIG. 6 to the dotted line position so that the load thereon will slide due to the action of gravity to the right as shown in FIG. 6 onto a receiving device such as a receiving chute C.

Referring to FIG. 1, at selected points where dumping is to take place along the conveyor, a cam track assembly 50 is provided which is adapted to selectively operate and dump the load by pivoting the tray 21 on the carrier 20 as the carrier 20 moves through the cam track assembly 50. As shown in FIGS. 3 and 6, linkage means comprising an operating rod 56 is pivoted at its lower end to the rear end wall 43 of the tray 21 by a ball joint 57 and at its upper end to an actuator 58 by a ball joint 59. Actuator 58 is, in turn, pivoted about a transverse horizontal axis to a bracket 60 on the carrier 20. Actuator 58 includes an actuator arm 61 which extends laterally outwardly and has a roller 62 thereon.

At predetermined points along the conveyor where it is desired to dump the load on the trays 21, cam tracks are provided and include spaced rails 66, 67 between which roller 62 on actuator arm 61 is guided and moves upwardly to the dotted line position shown in FIG. 3 and thereby swings the tray to the dotted line position shown in FIG. 6 to dump the load thereon.

As shown in FIG. 1, the top rail 66 includes a first upwardly bent portion 68, a second horizontal portion 69 and a downwardly bent portion 70. A pivoted cam tongue 71 is provided at one end of the lower track 67 adjacent the portion 68 of the upper track 66 and is adapted to be swung downwardly into position where it will guide the roller 62 between the tracks 66, 67 or upwardly to the position shown in FIG. 11 where the roller 62 will clear the cam tongue 71 so that no dumping movement of the tray will result.

As shown in FIG. 11, cam tongue 71 is normally held in its upward position by a latch 72 which is pivoted to the track portion 68 and has a dog 73 that engages a pin 74 on the cam tongue 71. An operating lever 75a is fixed on the tube 77 on which latch 72 is also fixed. A roller 75b is provided on the lower end of the operating lever 75a. The roller 75b is adapted to be engaged by a signal pin 75 (FIG. 4) mounted on a plate 76 on bar 25 that forms the leading edge of the leading carrier 20 of each group of carriers. As shown in FIG. 4, a plurality of signal pins 75 are provided on the leading carrier of each group of carriers and are frictionally held in raised or lowered positions, as may be desired. The signal pins 75 can be manually moved upwardly or downwardly so that they are selectively positioned. If the signal pin 75 is in position to be engaged by the roller 75b, the cam tongue 71 will be released permitting the roller 62 on the actuator arm 61 to move between the tracks 66, 67 and result in dumping of the tray. If, however, the signal pin 75 is not positioned in alignment with the roller 75b, the roller 75b of operating lever 75a will not be engaged to release latch 72 and the roller 62 of the actuator arm 61 will therefore clear and pass the station so that the group of carriers will not be dumped at that station.

As shown in FIG. 5, the operating lever 75a is selectively positioned on a tube 77 which is pivotally mounted on the bracket 30 so that its position can be adjusted if desired over any of the signal pin positions shown in FIG. 4. For a greater range of selections, a plurality of spaced operating levers 75c may be used with a plurality of elevated signal pins 75 thereby offering a greater number of signal combinations; such as shown in my copending application Serial No. 219,626, titled Conveyor Control System, filed August 27, 1962.

Figure 12:
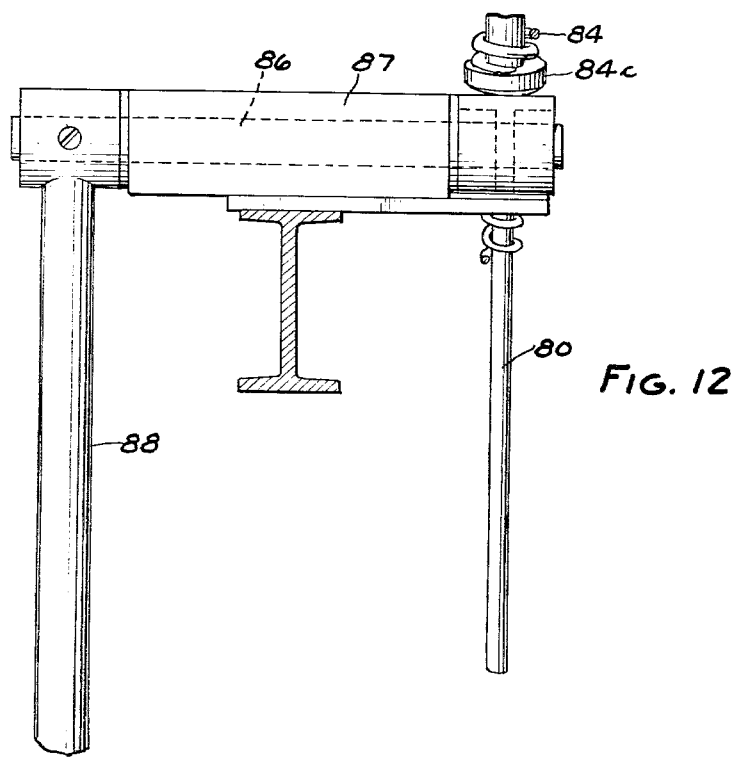
FIG. 12 is a fragmentary sectional view taken along the line 12—12 in FIG. 9.

In order to reset the cam tongue 71 to its latch position after it has been released and the carriers have been dumped, a reset mechanism is provided and, as shown in FIGS. 9 and 12, comprises a reset rod 80 which is pivoted to the cam tongue 71 by a ball joint 81 at its lower end and connected at its upper end to a lever 83 by an arrangement which includes helical springs 84, 85 that yieldingly connect the lever 83 to the rod 80. The lever is fixed to a shaft 86 journalled in a bracket 87. An operating rod 88 is fixed to the other end of the shaft 86 and includes a shoe 88a which is adapted to be engaged by a reset roller 89 on the leading carrier of each group of carriers. As the leading carrier of each group of carriers approaches a station, the reset roller 89 engages the shoe 88 and pivots the cam tongue 71 through the reset rod 80 upwardly to permit the dog 73 on the latch 72 to engage the pin 44. If the previous group of carriers has not dumped the trays at the station, the latch will have remained engaged and the action of the reset roller 89 on the shoe 88a will be taken up by a compression of the spring 84 without any movement of the cam tongue 71. Specifically, the upper end of rod 80 extends through a guide plate 80a on track 30. A helical spring 84 is telescoped over rod 80 compressed between the nut 84a and washer 84b on the extreme end of rod 80 and a bearing washer 84c adjacent operating lever 83 to urge lever 83 against a rubber stop 80b on plate 80a. A second helical spring 85 is telescoped over rod 80 and is compressed between the underside of plate 80a and a collar 85a on rod 80. The latch 72 thereby has a lost motion connection with operating rod 80.

In the form of the invention shown in FIGS. 7 and 8, the tray 90 has a bottom wall formed by spaced cross rails 91 extending between end walls 82 and rollers 93 between the cross rails 91. In this form, the bottom wall is substantially flat and the normal position of the tray is, as shown in FIG. 7, inclined slightly from the horizontal so that the load tends to move by gravity against a stop bar 94 extending between the end walls 62. When the tray is pivoted clockwise with respect to the view shown in FIG. 7, the load slides freely over the rollers to the chute. This type of device is particularly adapted for use where it is desired to keep the friction between the load and the bottom of the tray at a minimum.

Although the invention has been described in connection with a series of groups of carriers where individual carriers are to be controlled, the signal pins 75 and reset roller 89 can be provided on each carrier.

It can be seen that the invention has been described with reference to groups of carriers wherein the signal pins 75 and reset rollers 89 are provided on the leading carrier of each group of carriers. It can be appreciated that the reset roller can be provided on the trailing edge of the last carrier in each group of carriers. Similarly, where it is desired to control each carrier separately, each carrier can be provided with individual signal pins and a reset roller.

Figure 13:
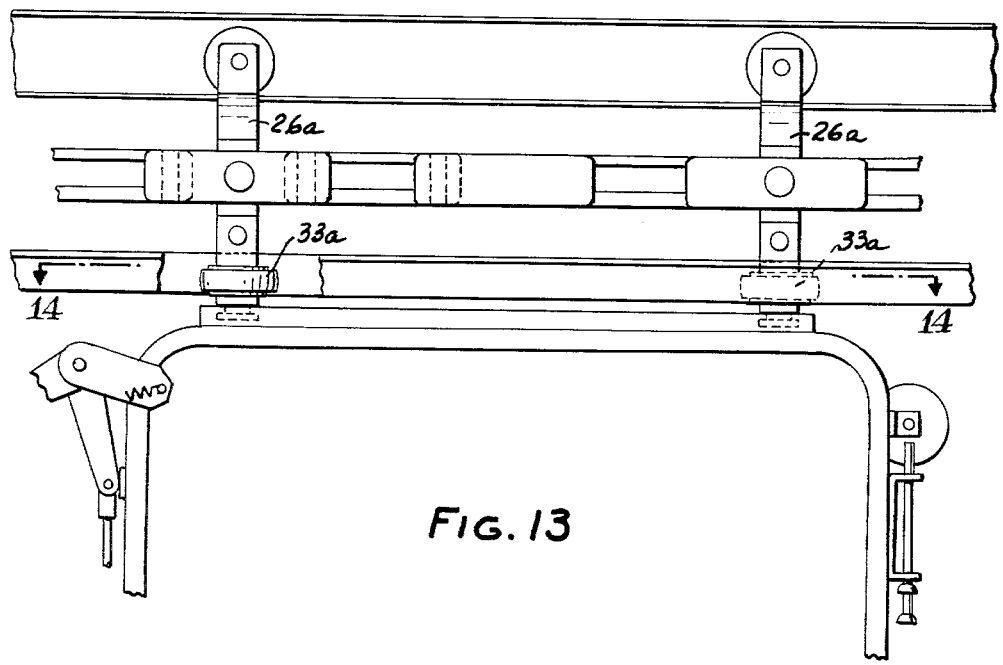
FIG. 13 is a fragmentary side elevation of a modified form of carrier.
Figure 14:
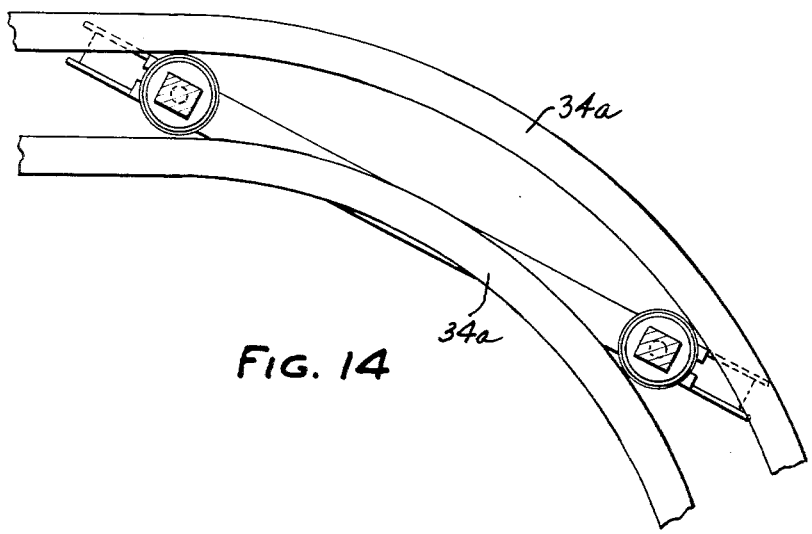
FIG. 14 is a fragmentary sectional view taken along the line 14—14 in FIG. 13.

In the form of carrier shown in FIGS. 13 and 14, the guide rollers 33 are replaced by guide rollers 33a on the trolleys 26a. In this form, the movement of the carrier around a relatively sharp corner such as the curve portion 34a of the track is greatly facilitated (FIG. 14).

In addition, in this form of conveyor, a cam track assembly 50 can be provided along the curved portion 34a for the purpose of controllably tilting the tray sufficiently to compensate for centrifugal forces on the carrier and thereby prevent the load from being thrown from the carrier when the carrier is moving rapidly around the curved track. In such an arrangement, the cam track assembly 50 is used for controlled tilting without dumping. This is achieved by making the cam track such that it tilts the tray in the desired direction sufficiently to compensate for centrifugal forces on the load but insufficiently to dump the load.

It can thus be seen that the invention provides for positive control of both the degree and rate of tilting of the load tray.

I claim:

1. In a dumping conveyor system, the combination comprising
    a series of carriers,
    each said carrier having a support thereon for supporting a load,
    said support being movable about an axis parallel to the axis of the carrier from a load supporting position to a load dumping position,
    means for guiding said carriers in a predetermined path,
    a cam track positioned at longitudinally spaced points along said path,
    an actuator pivotally mounted on each said carrier about an axis transverse to the axis of the carrier,
    said actuator being adapted to selectively engage said cam track and be positively guided thereby,
    linkage means mechanically operatively connecting said actuator to said support,
    the shape of said cam track being such that when said actuator engages said cam track said support is moved in a predetermined controlled manner from a load supporting to a load dumping position and back to a load supporting position,
    a portion of said cam track being movable into and out of the path of said actuator,
    control means associated with said cam track for said movable portion of said cam track,
    and means on each said carrier for selectively controlling said control means.

2. The combination set forth in claim 1 wherein said last-mentioned means comprises a plurality of fingers adapted to be selectively positioned for engagement with said control means.

3. The combination set forth in claim 1 including mechanical reset means supported adjacent said cam track and adapted to be mechanically actuated by a carrier for mechanically resetting said movable portion of said cam track to its position out of the path of said actuator.

4. The combination set forth in claim 1 wherein said cam track comprises
   a pair of vertically spaced rails lying in a substantially vertical plane between which a portion of the actuator is guided,
   said rails including a first portion cooperating with said movable portion to swing the actuator to a load dumping position,
   a second portion adapted to maintain the actuator in a load dumping position,
   and a third portion adapted to return the actuator to the load supporting position.

5. The combination set forth in claim 4 including
   mechanical means supported adjacent said cam track and adapted to be mechanically actuated by a carrier for mechanically resetting said movable portion of said cam track to its position out of the path of said actuator,
   said reset means including
   a latch for engaging said movable portion of said cam track and holding said movable portion out of the path of said actuator,
   a reset member mounted adjacent the path of said carrier,
   a reset contact member on said carrier adapted to engage said reset member,
   and means extending between said reset member and said latch for moving said movable portion of said cam track to a position out of the way of said actuator.

6. In a dumping conveyor system, the combination comprising
   a series of carriers,
   each said carrier having a support thereon for supporting a load,
   said support being movable about an axis parallel to the axis of the carrier from a load supporting position to a load dumping position,
   means for guiding said carriers in a predetermined path,
   a cam track positioned at longitudinally spaced points along said path,
   an actuator pivotally mounted on each said carrier about an axis transverse to the axis of the carrier,
   said actuator being adapted to selectively engage said cam track and be positively guided thereby,
   means mechanically operatively connecting said actuator to said support,
   the shape of said cam track being such that when said actuator engages said cam track said support is moved in a predetermined controlled manner from a load supporting to a load dumping position and back to a load supporting position,
   a portion of said cam track being movable into and out of the path of said actuator,
   control means associated with said cam track for said movable portion of said cam track,
   means on each said carrier for selectively controlling said control means,
   mechanical reset means supported adjacent said cam track and adapted to be mechanically actuated by a carrier for mechanically resetting said movable portion of said cam track to its position out of the path of said actuator,
   said reset means including
   a latch for engaging said movable portion of said cam track and holding said movable portion out of the path of said actuator,
   a reset member mounted adjacent the path of said carrier,
   a reset contact member on said carrier adapted to engage said reset member,
   and lost-motion means extending between said reset member and said latch for moving said movable portion of said cam track to a position out of the way of said actuator.

7. The combination set forth in claim 6 wherein said control means is operable to disengage said latch,
   said control means comprising an operating lever adapted to move said latch to permit release of said movable portion of said cam track,
   said carrier having a plurality of signal pins thereon,
   one of said signal pins being adapted to be selectively positioned for engaging said operating lever and releasing said latch.

8. In a dumping conveyor system, the combination comprising
   a carrier,
   said carrier having a support thereon for supporting a load,
   said support being movable about an axis parallel to the axis of the carrier from a load supporting position to a load dumping position,
   means for guiding said carrier in a predetermined path,
   a cam track positioned at longitudinally spaced points along said path,
   an actuator pivotally mounted on said carrier about an axis transverse to the axis of the carrier,
   said actuator being adapted to selectively engage said cam track and be positively engaged thereby,
   means mechanically operatively connecting said actuator to said support,
   the shape of said cam track being such that when said actuator engages said cam track said support is moved from a load supporting to a load dumping position and back to a load supporting position in a predetermined controlled manner,
   a portion of said cam track being movable into and out of the path of said actuator,
   control means associated with said cam track for said movable portion of said cam track,
   means on said carrier for selectively controlling said control means,
   mechanical reset means supported adjacent said cam track and adapted to be mechanically actuated by said carrier for mechanically resetting said movable portion of said cam track to its position out of the way of said actuator,
   said reset means including
   a latch for engaging said movable portion of said cam track and holding said movable portion out of the path of said actuator,
   said reset means comprising a reset rod mounted adjacent the path of said carrier for reciprocating movement and operatively connected to said movable portion of said cam track,
   a reset roller on said carrier adapted to engage said operating lever,
   a reset operating lever mounted on said track in the path of said roller,
   and lost-motion means extending between said reset operating lever and said reset rod for moving said movable portion of said cam track to a position out of the way of said actuator.

9. The combination set forth in claim 8 wherein said control means is operable to disengage said latch,
   said control means comprising an operating lever pivotally mounted adjacent said track and operatively connected to said latch to move said latch to permit release of said movable portion of said cam track,
   said carrier having a plurality of signal pins thereon,
   one of said signal pins being adapted to be selectively positioned for engaging said operating lever and releasing said latch.

10. In a dumping conveyor system, the combination comprising
    a carrier,
    said carrier having a support thereon for supporting a load, said support being movable angularly relative to said carrier about an axis parallel to the axis of the carrier, means for guiding said carrier in a predetermined path, a cam track positioned at longitudinally spaced points along said path, an actuator pivotally mounted on said carrier about an axis transverse to the axis of the carrier, said actuator being adapted to selectively engage said cam track and be positively guided thereby, linkage means mechanically operatively connecting said actuator to said support, the shape of said cam track being such when said actuator engages said cam track said support is controllably moved in a predetermined controlled manner relative to said carrier to and from an angular position, a portion of said cam track being movable into and out of the path of said actuator, control means associated with said cam track for said movable portion of said cam track, and means on said carrier for selectively controlling said control means.

References Cited by the Examiner

UNITED STATES PATENTS

| | | | |
|---|---|---|---|
| 1,804,154 | 5/1931 | Cowley et al. | 198—38 |
| 1,986,420 | 1/1935 | Webb et al. | 198—38 |
| 2,253,572 | 8/1941 | Mitchell | 198—38 |
| 2,377,848 | 6/1945 | Bailey | 198—38 |
| 2,456,224 | 12/1948 | Sullivan | 198—177 |
| 2,666,535 | 1/1954 | Dooley | 198—155 X |
| 2,854,126 | 9/1958 | Rosenberger | 198—155 |
| 3,032,172 | 5/1962 | Jensen | 198—177 |
| 3,147,845 | 9/1964 | Harrison et al. | 198—38 |

FOREIGN PATENTS 822,071  11/1951  Germany.

SAMUEL F. COLEMAN, *Primary Examiner*

WILLIAM B. LA BORDE, *Examiner.*